United States Patent
Cannon et al.

(10) Patent No.: US 6,430,270 B1
(45) Date of Patent: Aug. 6, 2002

(54) AUTOMATIC CONVERSATIONAL RECORD

(75) Inventors: Joseph M. Cannon, Harleysville; James A. Johanson, Emmaus; James H. Fox, Allentown, all of PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/181,569

(22) Filed: Oct. 29, 1998

(51) Int. Cl.[7] .............................. H04M 1/64; H04M 1/56
(52) U.S. Cl. .................. 379/88.19; 379/88.2; 379/67.1; 379/142.04; 379/142.17
(58) Field of Search ................................ 379/142, 93.17, 379/93.24, 127, 45, 67.1, 88.19, 88.2, 88.26, 88.12, 142.04, 142.06, 127.01, 127.06

(56) References Cited

U.S. PATENT DOCUMENTS

| | | | | |
|---|---|---|---|---|
| 4,481,382 A | * | 11/1984 | Villa-Real .................. 379/67.1 |
| 4,833,704 A | * | 5/1989 | Hashimoto ................. 379/67.1 |
| 5,278,896 A | * | 1/1994 | Sakata et al. ............. 379/67.1 |
| 5,533,104 A | * | 7/1996 | Weiss et al. ............... 379/67.1 |
| 5,535,261 A | * | 7/1996 | Brown et al. .............. 379/67.1 |
| 5,559,872 A | * | 9/1996 | Van Huyssteen .......... 379/130 |
| 5,646,839 A | * | 7/1997 | Katz ........................ 379/93.01 |
| 5,651,053 A | * | 7/1997 | Mitchell .................... 379/142 |
| 5,684,863 A | * | 11/1997 | Katz ........................... 379/142 |
| 5,784,436 A | * | 7/1998 | Rosen et al. ............. 379/88.21 |
| 5,822,416 A | * | 10/1998 | Goodacre et al. ........... 379/142 |
| 5,828,730 A | * | 10/1998 | Zebryk et al. ................ 379/88 |
| 5,835,585 A | * | 11/1998 | Morse ......................... 379/424 |
| 5,901,209 A | * | 5/1999 | Tannenbaum et al. ....... 379/142 |
| 5,903,135 A | * | 5/1999 | Possess et al. ................ 379/88 |
| 5,923,746 A | * | 7/1999 | Baker et al. ................ 379/265 |
| 5,929,752 A | * | 7/1999 | Janky et al. ................ 340/426 |
| 5,930,698 A | * | 7/1999 | Bertacci ....................... 379/45 |
| 5,982,857 A | * | 11/1999 | Brady ..................... 379/88.19 |
| 6,072,860 A | * | 6/2000 | Kek et al. .................. 379/67.1 |
| 6,130,936 A | * | 10/2000 | Hartmann ................... 379/142 |
| 6,166,626 A | * | 12/2000 | Janky et al. ................ 340/426 |
| 6,233,320 B1 | * | 5/2001 | Haimi-Cohen ........... 379/88.27 |
| 6,246,489 B1 | * | 6/2001 | Park ........................... 358/442 |
| 6,252,944 B1 | * | 6/2001 | Hansen, II et al. ...... 3379/67.1 |
| 6,366,653 B1 | * | 4/2002 | Yeh et al. ................ 379/93.05 |

* cited by examiner

Primary Examiner—Rexford Barnie
(74) Attorney, Agent, or Firm—William H. Bollman

(57) ABSTRACT

Customer premises telephone equipment and methods are provided for automatically recording telephone conversations based on a comparison of call related information (for incoming calls) or dialed telephone numbers (outgoing calls) to entries in a user defined automatic conversational record table. An automatic conversational record module compares the received or entered call related information, e.g., a telephone number, to the entries in the user defined automatic conversational record table and automatically activates recordation of the telephone conversation if a match is determined. The entries in the user defined automatic conversation record table may be entered manually, e.g., using a keypad, may be based upon previously received call related information, or may be transferred from other memory in the customer premises equipment, e.g., speed dial telephone numbers.

24 Claims, 5 Drawing Sheets

AUTOMATIC CONVERSATIONAL RECORD

BACKGROUND OF THE INVENTION

1. Field of the Invention

This invention relates generally to a customer premises equipment which is capable of recording a conversation between a user and certain calling or called parties. More particularly, it relates to customer premises equipment which automatically records the conversation between the user and the calling or called party based on a comparison of predetermined call related information relating to the calling or called party with predetermined entries in an appropriate table.

2. Background of Related Art

Customer premises equipment, e.g., telephone answering devices (i.e., answering machines) are useful devices for both the home and office environments. Many conventional telephone answering devices offer a feature commonly called "conversational record".

Conversational record allows users to manually initiate a record mode such that conversation on the telephone line will be recorded.

When the user of a telephone having conversational record capability places an outgoing telephone call or receives an incoming telephone call, they may manually activate the conversational record feature of the telephone answering device to begin recording the conversation between the user and the calling or called party. The telephone answering device will typically continue to record the conversation regardless of who is on the telephone line until the user deactivates the conversational record feature, or terminates the telephone call.

FIG. 5 illustrates a conventional telephone answering device 11 capable of answering an incoming telephone call on a telephone line 15 and having the capability for manual activation of a conversational record feature.

In FIG. 5, a telephone answering device 11 is connected to a telephone company central office 13 via a telephone line 15. A telephone line interface (TLI) 17 in the telephone answering device 11 provides the conventional isolation, DC and AC impedance as required by telephone company standards. The telephone line interface 17 also provides a ring detect signal to a controller 19. The ring detect signal indicates to the controller 19 the ringing of an incoming call on the telephone line 15.

The controller 19 can be any suitable processor, e.g., a microprocessor, a microcontroller, or a digital signal processor (DSP).

The controller 19 may include a dual tone multi frequency (DTMF) decoder 21 and/or a DTMF generator 23 to detect and generate, respectively, control signals relating to a telephone call.

The user can pre-record an appropriate outgoing greeting message into non-volatile memory in the conventional telephone answering device 11 using a microphone 37 and the voice recorder/playback audio module 27.

After a desired number of ring signals, the telephone answering device 11 causes the telephone line interface 17 to place the telephone line in an off-hook state, and instructs a voice recorder/playback audio module 27 to play an outgoing greeting message to the calling party on the telephone line 15.

Upon completion of the playback of the outgoing greeting message, the calling party typically can record a voice message in a non-volatile voice message memory 29, e.g., Flash memory, under the control of the controller 19.

A keypad 25 and/or a display 33 allow the user to select various modes of operation, including appropriate instruction and control to playback recorded voice messages through a speaker 39 connected to the voice recorder/playback audio module 27, or to record a current conversation in voice message memory 29.

The conventional telephone answering device 11 further includes a conversational record button 35 connected to the controller 19. The conversational record button 35 allows a user manual control of the activation and inactivation of the conversational record feature. For instance, to activate the conversational record feature when a user places an outgoing telephone call using a conventional telephone answering device 11, or when the user receives an incoming telephone call on the conventional telephone answering device 11, the user must manually depress or activate the conversational record button 35.

Activation of the conversational record feature begins the process of recording the conversation between the user and the calling or called party. The conventional telephone answering device 11 will typically continue to record the conversation until the user again manually depresses the conversational record button 35 to deactivate the conversational record feature, or terminates the telephone call.

In some instances, the user may forget to activate the conversational record feature on the telephone answering device 11 even though the user wished to record the telephone conversation. Moreover, the user might answer a calling party's telephone call on an extension remote from the telephone answering device 11 such that the user can not activate the conversational record feature on the telephone answering device 11 from the extension telephone. Furthermore, an incoming telephone call might be a harassing telephone call and/or obscene telephone call, and the user may not recognize the caller or the content of the telephone call at the very beginning of the telephone call. In all these instances, with conventional manual activation of a conversational record feature, the user will have lost all or important portions of the conversation. Although the conversational record feature can be continuously activated to record all telephone calls, this technique is quite wasteful of storage resources.

Accordingly, there exists a need for a customer premises equipment which is capable of recording desired telephone conversations without the risk of losing all or important parts of the conversation.

SUMMARY OF THE INVENTION

In accordance with the principles of the present invention, a conversational record feature for customer premises equipment comprises a user defined conversational record table adapted to contain a plurality of entries relating to telephone calls for which activation of a conversational record feature is desired. An automatic conversations record module is adapted to compare one of received call related information and a dialed telephone number to each of the plurality of entries in the user defined conversational record table, and activate the conversational record feature if a match is determined.

In accordance with another aspect of the present invention, a customer premises equipment comprises a telephone line interface, a voice recorder module, and a processor. An automatic conversational record module is operable by the processor to cause the voice recorder module to record a conversation present on the telephone line interface, and a user defined plurality of stored call related information relating to telephone calls for which conversational record is to be activated by the automatic conversational record module.

A method of activating a conversational record feature in accordance with another aspect of the present invention comprises receiving call related information regarding an incoming call. The received call related information is compared to at least one predetermined call related information. If a match is determined by the step of comparing, a conversational record feature is activated without further instruction required from a user.

Another method of activating a conversational record feature comprises detecting a dialed telephone number relating to an outgoing telephone call. The detected dialed telephone number is compared to at least one predetermined telephone number. If a match is determined by the step of comparing, a conversational record feature is activated without further instruction required from a user.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a customer premises equipment and method which has the capability to automatically record a telephone conversation based on call related information of a calling party, or on all or part of the dialed digits of a dialed outgoing telephone call to a called party, or time or date. Also, recording can be performed based on voice identification of a calling party using a suitable voice recognition device.

With respect to call related information relating to a calling party, one exemplary call information related service commonly available in the United States is called Calling Identity Delivery (Caller ID). Caller ID allows the user of a telephone or other customer premises equipment the ability to determine the household name and/or telephone number of a calling party. Type I Caller ID information is transmitted from the local telephone company to the called party while the called party's phone is in a hung-up or on-hook state, e.g., between the first and second rings. Type II Caller ID/Call Waiting service allows the transmission of call related information to a called party while the called party is already using their telephone line.

Figure 1:
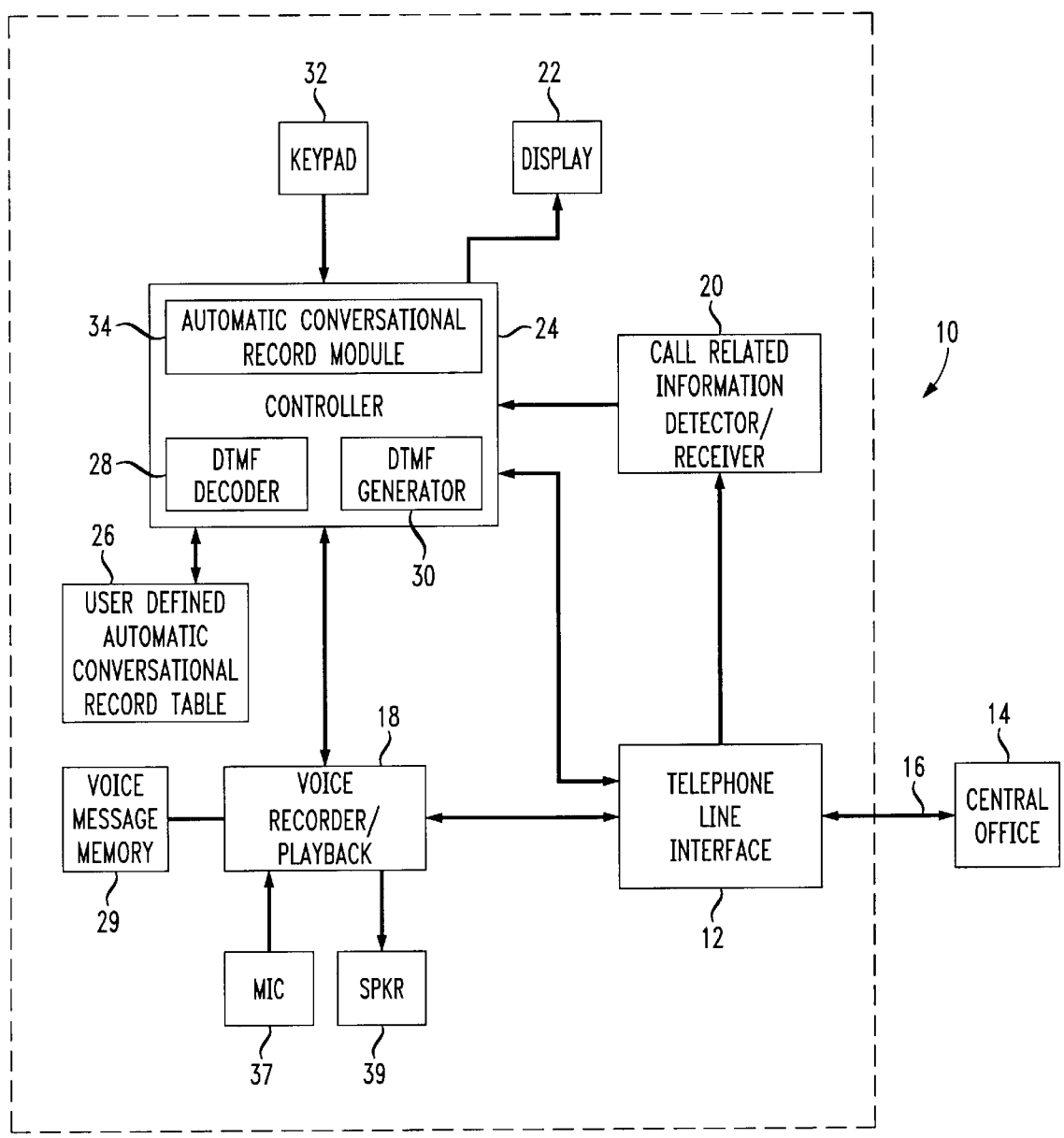
FIG. 1 is a block diagram illustrating a customer premises equipment having an automatic conversational record module and a user defined automatic conversational record table constructed in accordance with the present invention.

FIG. 1 illustrates a customer premises equipment, such as a telephone answering device 10, capable of automatically recording a telephone conversation of calling and/or called parties, in accordance with the principles of the present invention.

While the described embodiments of the present invention relate to a telephone answering device, the principles of the present invention relate equally to the use of such an automatic conversational record feature with other types of voice messaging systems.

In FIG. 1, the telephone answering device 10 includes a telephone line interface (TLI) 12, a voice recorder/playback module 18, a controller 24, and a call related information detector receiver 20, each otherwise as in conventional telephone answering devices. However, importantly, the telephone answering device in accordance with the principles of the present invention additionally includes an automatic conversational record module 34 which utilizes information from the call related information detector/receiver 20, and a user defined automatic conversational record database, e.g., table 26.

The telephone line interface 12 allows interconnection with a central office 14 via a telephone line 16. The telephone line interface 12 interconnects the telephone line 16 with a voice recorder/playback module 18.

The controller 24 can be any suitable processor, e.g., a microprocessor, a digital signal processor, or a microcontroller.

The call related information detector/receiver 20 is, e.g., adapted for detecting and receiving Caller ID information regarding a calling party on the telephone line 16. For instance, the call related information detector/receiver 20 obtains a telephone number and/or a household name associated with the incoming telephone call and provides the same to the controller 24 for display on a display 22, and for use in the automatic conversational record module for incoming calls.

Figure 5:
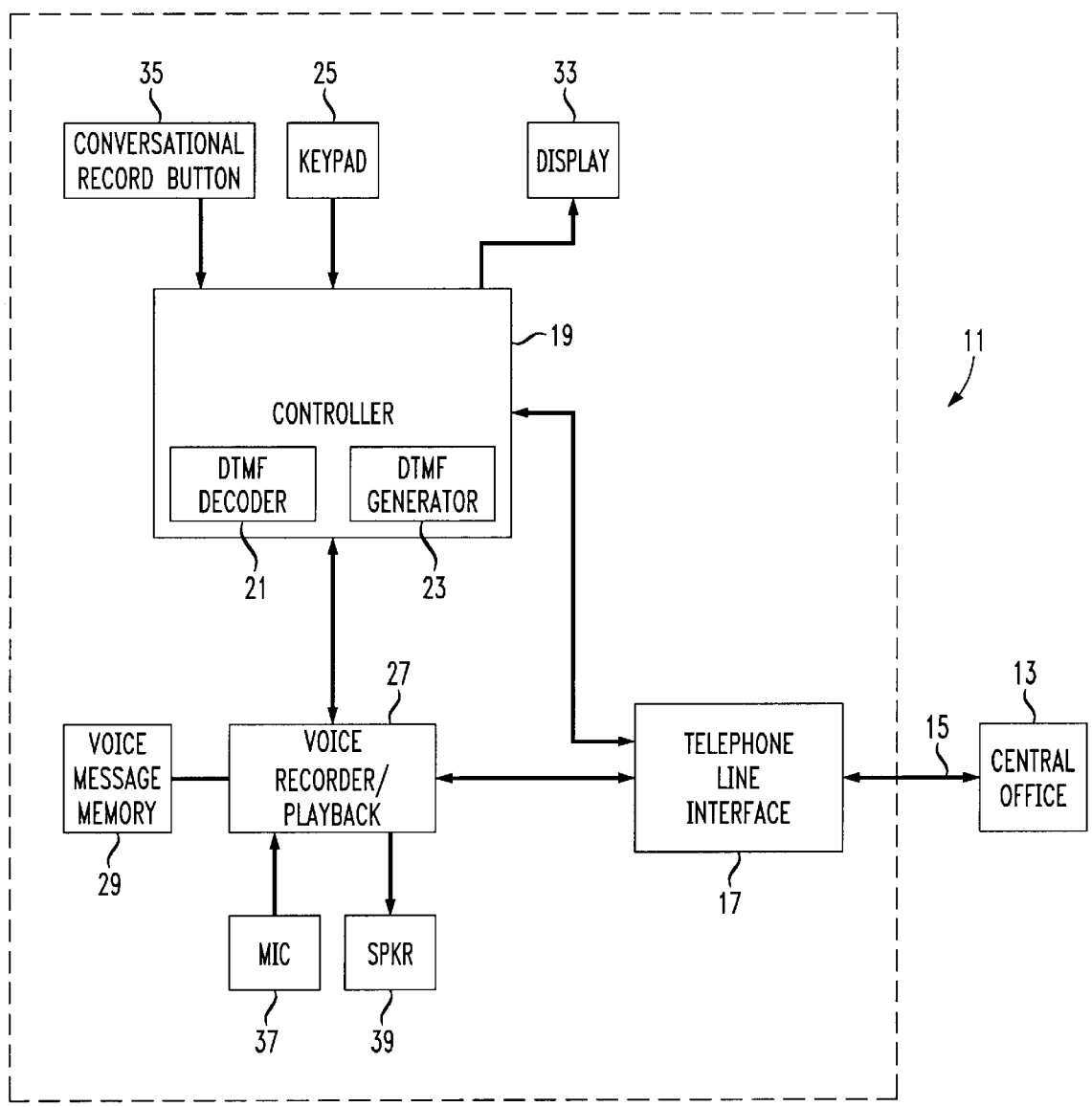
FIG. 5 illustrates a conventional telephone answering device including a manually activated conversational record feature.

The voice recorder/playback module 18 includes a microphone 37, a speaker 39, and voice message memory 29 as in conventional devices, e.g., as shown in FIG. 5.

The automatic conversational record module 34 compares received call related information with pre-stored call related information stored by the user in the user defined automatic conversational record table 26. Entries in the automatic conversational record table 26 can be entered manually on the keypad 32 upon appropriate prompting by the controller 24, e.g., using the display 22. Alternatively, a dedicated button (not shown) can be activated by a user to cause storage of call related information regarding a current telephone call into the user defined automatic conversational record table 26. Moreover, entries in the user defined automatic conversational record table 26 can be transferred from other memory in the telephone answering device 10, e.g., from a list of speed dial telephone numbers.

The controller 24 is capable of entering an appropriate mode allowing display on the display 22 of current entries in the user defined automatic conversational record table 26. Preferably, the entries are scrolled up and down using appropriate dedicated scrolling buttons (not shown). Moreover, just as entries can be added to the user defined automatic conversational record table 26, entries can be deleted by the user by the activation of an appropriate delete key while a particular entry is being displayed on the display 22.

If the automatic conversational record module 34 determines a match between received call related information and corresponding information in the user defined automatic conversational record table 26, the controller 24 causes the voice recorder/playback module 18 to automatically begin recording the telephone call.

When recording a conversation, appropriate notification to the caller can be provided, e.g., by causing a beep on the telephone line or by other means. The beep may be generated by a tone generator, e.g., a DTMF generator 30 in the controller 24.

More sophisticated recording techniques can be implemented. For instance, only one side of the conversation may be recorded using an appropriate hybrid echo canceler (HEC). For instance, the far end voice may be canceled from the conversation leaving only the near end user's voice for recording.

Moreover, recording can be automated based on predetermined criteria. For instance, harassing telephone calls may be determined based on call patterns, e.g., four times an hour for several hours, etc. In such a case, the recording mechanism may be automatically initiated (giving proper notice to the calling and called parties).

Furthermore, the applicability of local statutes and regulations governing the recording of telephone calls may be integrated in the controller 24 so that proper notice may be flexibly adjusted according to the location of the calling party based on an interpretation of the area code and/or exchange number of call related information (e.g., Caller ID information) received with respect to a caller's telephone call. For instance, if the call related information indicates that the caller is from a State requiring a certain type of notice of the recording of the conversation, e.g., a beep every five seconds, a beep at the beginning of the call, etc., then the controller 24 can initiate a customized notification to the calling party.

The telephone answering device 10 of the present invention further includes a DTMF decoder 28 and the DTMF generator 30 implemented within the controller 24. However, as illustrated in FIG. 2, the DTMF generator 30 can be separate from the controller 24, but nevertheless preferably be capable of communication with the controller 24.

Figure 2:
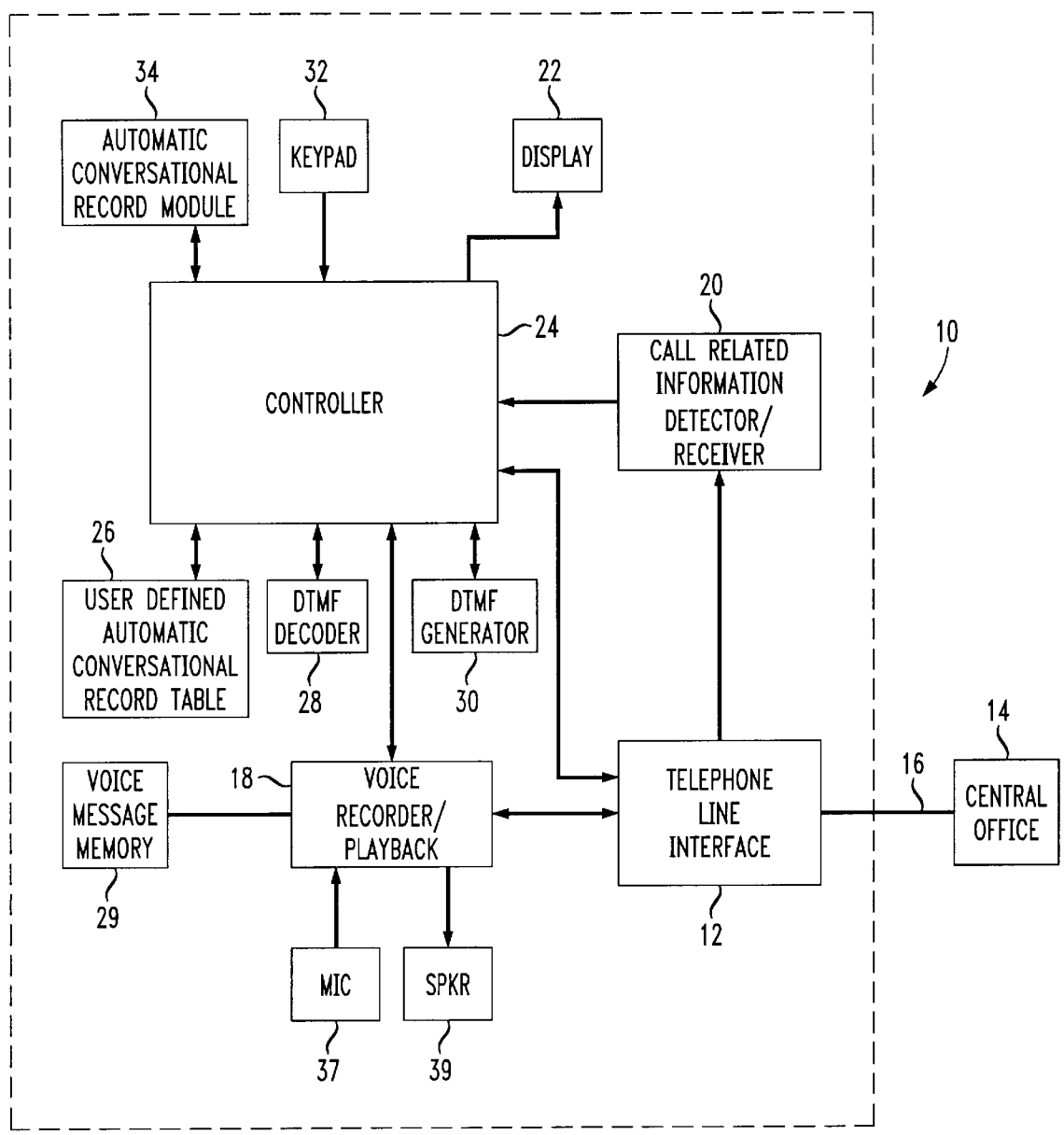
FIG. 2 is another block diagram illustrating a customer premises equipment having an automatic conversational record module and a user defined automatic conversational record table constructed in accordance with the present invention.

Referring to FIGS. 1 and 2, the telephone answering device 10 further includes a DTMF decoder 28 for use in detecting dialed telephone digits input by the user on the alphanumeric, DTMF keypad 32. Thus, the automatic conversational record module 34 can automatically activate a conversational record feature even for outgoing telephone calls by comparing a dialed telephone number to telephone numbers stored in the user defined automatic conversational record table 26.

If input from the particular key presses are not integrated with the controller 24, then the controller 24 can be adapted to decode outgoing DTMF tones present on the telephone line generated by the alphanumeric keypad 32.

The automatic conversational record module 34 is preferably a software module included within the program code of the controller 24. Of course, as illustrated in FIG. 2, the automatic conversational record module 34 can be implemented separate from the controller 24, but regardless, will preferably be in communication with the controller 24.

To automatically activate the conversational record feature, the automatic conversational record module 34 compares either the incoming call related information (e.g., Caller ID information such as the telephone number and/or household name) or the dialed telephone number with the current entries in the user defined automatic conversational record table 26 to determine which incoming telephone calls and which outgoing telephone calls are subject to automatic conversational recording. Alternatively, only a portion of the incoming and outgoing telephone numbers can be compared to the entries in the automatic conversational record table 26, e.g., only the area code. If no match is found, then the automatic conversational record module 34 will not be activated and the telephone conversation will not be recorded unless the conversational record feature is manually activated. If a match is found, then, the automatic conversational record module 34 will be activated and the telephone conversation will be automatically recorded without the user having to manually activate the conversational record feature. In this way, the user of the telephone answering device 10 can automatically record only certain predetermined telephone calls originating from and/or destined for a certain area code, for instance.

As discussed above, the user defined automatic conversational record table 26 can be comprised of telephone numbers and/or household names. However, the user defined automatic conversational record table 26 can alternatively or additionally include other caller related information or criteria input by the user to identify a calling or called party, e.g., credit card or calling card numbers.

The present invention is also applicable for use with manually activated conversational record modules. In particular, upon depression of a button by a user to activate conversational record, the received call related information (e.g., Caller ID information) may be utilized to determine the applicable notification signals required by the caller. For instance, the area code of the call information may be compared to a table of area codes and applicable notification signals for those regions of the country. In this way, even when the conversational record feature is manually activated, the proper notification signal can be automatically provided to the caller based on call related information received with an incoming telephone call (or based on dialed digits of an outgoing telephone call.

Figure 3:
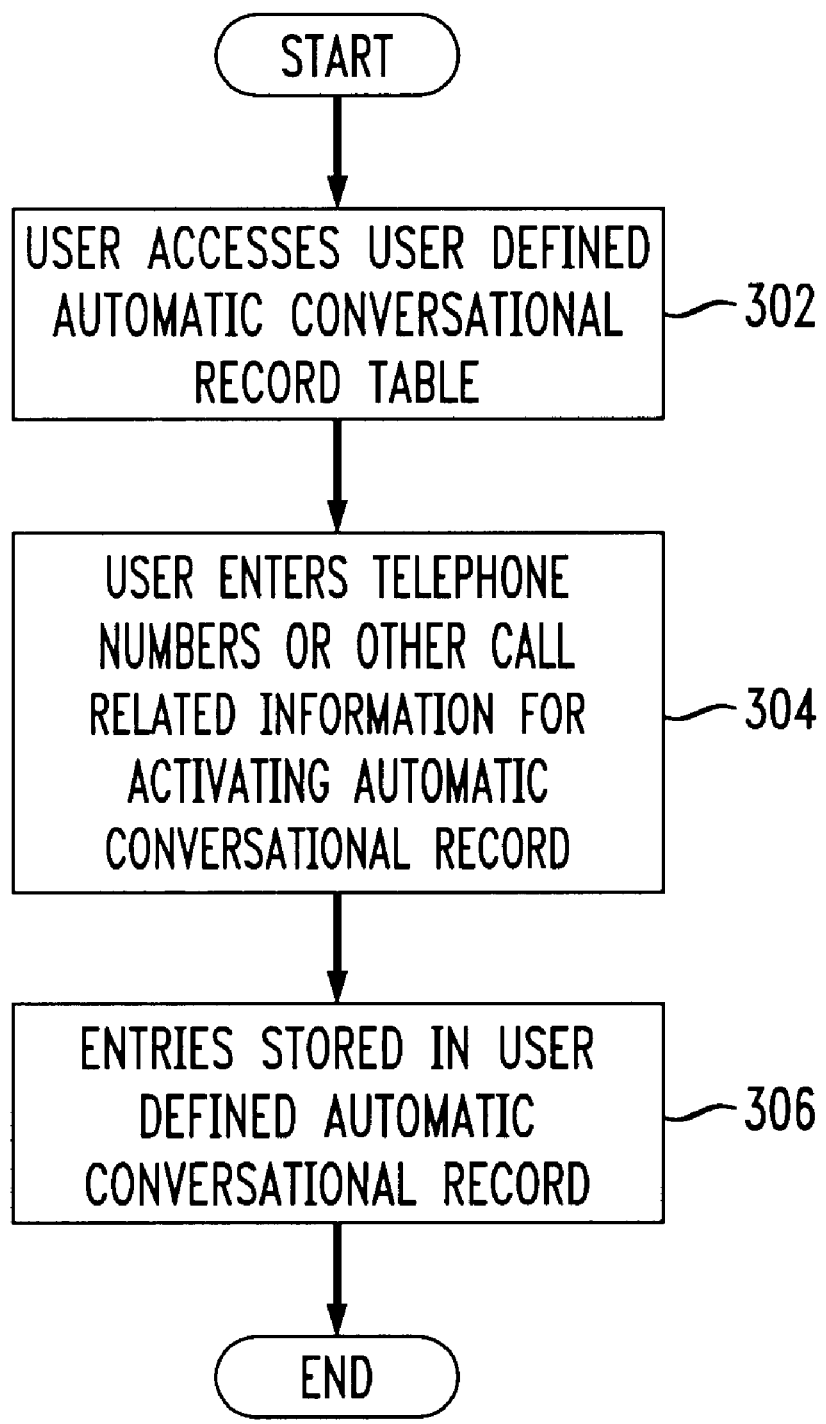
FIG. 3 is a flow chart illustrating the process by which the user defined automatic conversational record table is created by a user of the customer premises equipment of FIG. 1 or FIG. 2 constructed in accordance with the present invention.

FIG. 3 shows an exemplary process by which the user can input entries into the automatic conversational record table 26.

In particular, in step 302, the user first accesses the user defined automatic conversational record table 26.

In step 304, the user enters the telephone numbers or other call related information for automatically activating the conversational record feature of the telephone answering device 10 using the keypad 32.

In step 306, the call related information entries entered by the user are stored in the user defined automatic conversational record table 26.

Figure 4:
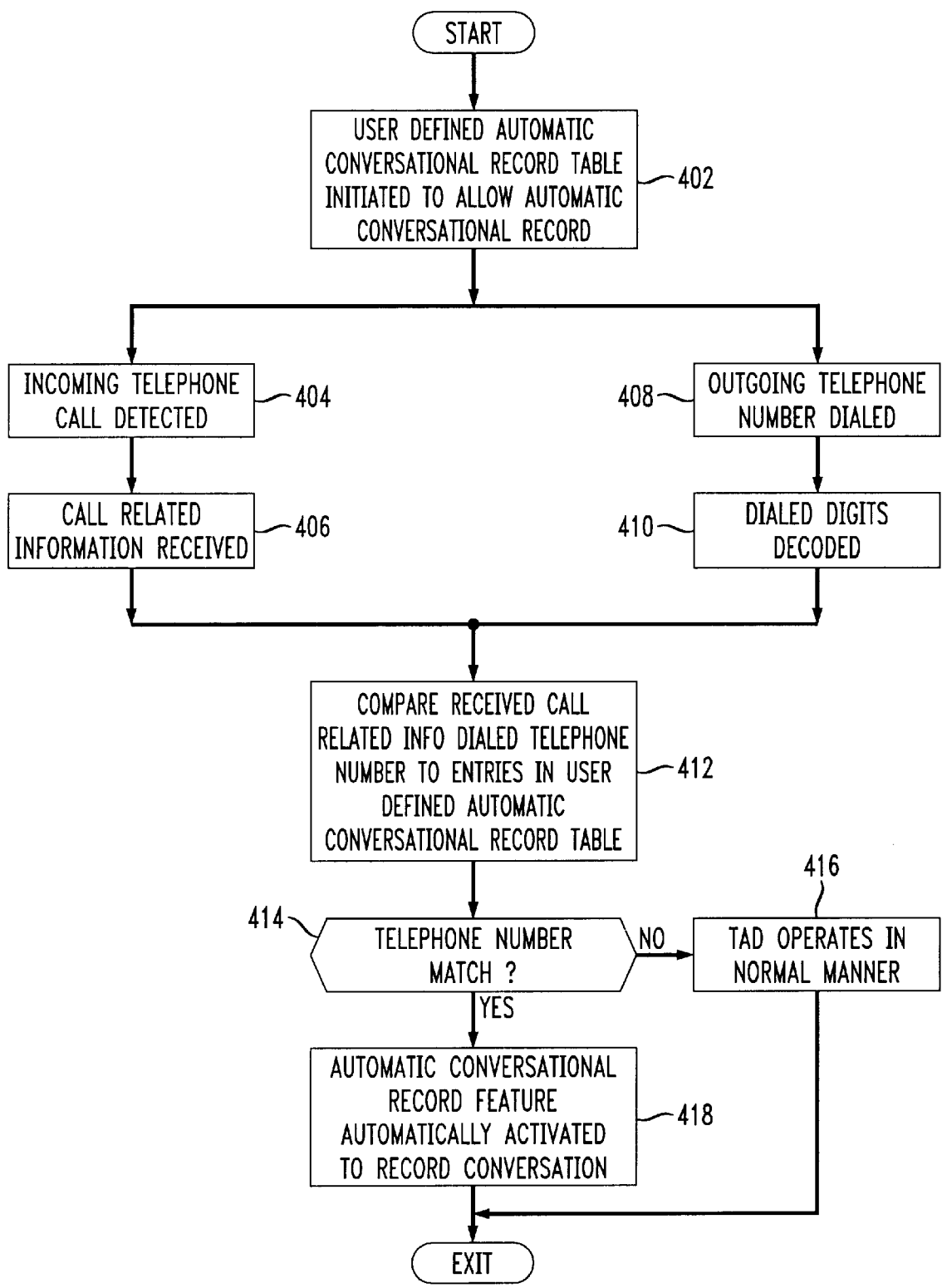
FIG. 4 is a flow chart illustrating an exemplary process of automatically recording a conversation of a user and a calling or called party.

FIG. 4 illustrates an exemplary process by which the telephone answering device 10 automatically activates the conversational record feature to thereby automatically record a telephone conversation.

In particular, in step 402, the user initiates at least one entry in the user defined automatic conversational record table 26 (e.g., as shown in FIG. 3) to allow subsequent automatic activation of the conversational record feature by the telephone answer device 10.

For incoming telephone calls, in step 404, an incoming telephone call is detected by the telephone line interface 12 and controller 24. In step 406, call related information is received by the call related information detector/receiver 20 and provided to the automatic conversational record module 34.

Alternatively, for outgoing telephone calls, in step 408, the user dials an outgoing telephone number, e.g., using the keypad 32 or by activating a particular speed dial telephone number. In step 410, the dialed digits are decoded by the DTMF decoder 30 if necessary.

The received call related information or dialed telephone number are compared to the call related information entries stored in the user defined automatic conversational record table 26, as shown in step 412.

In decision step 414, it is determined whether the incoming call related information or the dialed outgoing telephone number matches any entry in the user defined automatic conversational record table 26.

In step 416, if no match is found, the telephone answering device 10 operates in a normal manner such that the conversational record feature will not be automatically activated by the automatic conversational record module 34. In this case, the user can still choose to record the telephone conversation by manually activating the conversational record feature of the telephone answering device 10 in a conventional fashion.

In step 418, if a match is found between the incoming call related information or the dialed outgoing telephone number and any entry in the user defined automatic conversational record table 26, the automatic conversational record module 34 will automatically activate the conversational record feature of the telephone answering device 10.

Voice messaging systems including an automatic conversational record module and appropriate user defined automatic conversational record database in accordance with the principles of the present invention offer advantages over conventional devices requiring manual or constant activation of a conversational record feature. For instance, a user is provided the added protection and security of automatic recordation of desired telephone calls even before they are answered by the user. Moreover, desired conversations are not missed, e.g., because the user is at an extension telephone, or because the user simply forgets to manually activate a conversational record feature.

While the invention has been described with reference to the exemplary embodiments thereof, those skilled in the art will be able to make various modifications to the described embodiments of the invention without departing from the true spirit and scope of the invention.

What is claimed is:

1. A conversational record feature for customer premises equipment, comprising:

a conversational record table in, a telephone answering device including a single line telephone line interface connected directly to a central office of a telephone company without going through a customer premises telephone switch and adapted to contain a plurality of entries relating to telephone calls for which activation of a conversational record feature is desired; and an automatic conversations record module in said telephone answering device adapted to compare one of received call related information and a dialed telephone number to said plurality of entries in said conversational record table, and to activate said conversational record feature if a match is determined.

2. The conversational record feature according to claim 1, wherein:

said call related information is a telephone number.

3. The conversational record feature according to claim 1, wherein:

said call related information is a portion of a telephone number.

4. The conversational record feature according to claim 1, wherein:

said call related information is an identify of a caller's voice.

5. The conversational record feature according to claim 3, wherein:

said portion of said telephone number is an area code.

6. The conversational record feature according to claim 3, wherein:

said portion of said telephone number is an exchange number.

7. The conversational record feature according to claim 1, wherein:

said call related information is a household name.

8. The conversational record feature according to claim 1, wherein:

said call related information is a calling card number.

9. The conversational record feature according to claim 1, further comprising:

a call related information detector/receiver in said telephone answering device including said single line telephone line interface adapted to receive said call related information regarding an incoming telephone call.

10. The conversational record feature according to claim 9, wherein:

said call related information is Caller ID information.

11. A customer premises equipment comprising:

a single line telephone line interface;

a voice recorder module in a telephone answering device including said single line telephone line interface connected directly to a central office of a telephone company without going through a customer premises telephone switch;

a processor in said telephone answering device;

an automatic conversational record module in said telephone answering device operable by said processor to cause said voice recorder module to record a conversation present on said single line telephone line interface; and a user defined plurality of stored call related information relating to telephone calls for which conversational record is to be activated by said automatic conversational record module.

12. The customer premises equipment according to claim 11, further comprising:

voice message memory in said telephone answering device including said single line telephone line interface adapted for storage of a recorded conversation.

13. The customer premises equipment according to claim 11, further comprising:

a dual tone, multiple frequency decoder in said telephone answering device including said single line telephone line interface adapted to detect digits of a dialed telephone number from said customer premises equipment.

14. The customer premises equipment according to claim 11, further comprising:

a call related information detector/receiver in said telephone answering device including said single line telephone line interface adapted to receive call related information regarding an incoming telephone call.

15. The customer premises equipment according to claim 14, wherein:

said call related information is Caller ID information.

16. A method of activating a conversational record feature, comprising:

receiving call related information regarding an incoming call in a telephone answering device including a single line telephone line interface connected directly to a central office of a telephone company without going through a customer premises telephone switch;

comparing in said telephone answering device the received call related information to at least one pre-determined call related information; and if a match is determined by said step of comparing, activating a conversational record feature in said telephone answering device without further instruction required from a user.

17. A method of activating a conversational record feature, comprising:

detecting a dialed telephone number relating to an outgoing telephone call in a telephone answering device including a single telephone line interface connected directly to a central office of a telephone company without going through a customer premises telephone switch;

comparing in said telephone answering device the detected dialed telephone number to at least one pre-determined telephone number; and if a match is determined by said step of comparing, activating a conversational record feature in said telephone answering device without further instruction required from a user.

18. Apparatus for activating a conversational record feature, comprising:

means for receiving call related information regarding an incoming call in a telephone answering device including a single line telephone line interface connected directly to a central office of a telephone company without going through a customer premises telephone switch;

means in said telephone answering device for comparing the received call related information to at least one pre-determined call related information; and means in said telephone answering device for activating a conversational record feature if a match is determined by said means for comparing, without further instruction required from a user.

19. Apparatus for activating a conversational record feature, comprising:

means for detecting a dialed telephone number relating to an outgoing telephone call in a telephone answering device including a single line telephone line interface connected directly to a central office of a telephone company without going through a customer premises telephone switch;

means in said telephone answering device for comparing the detected dialed telephone number to at least one pre-determined telephone number; and means in said telephone answering device for activating a conversational record feature if a match is determined by said means for comparing, without further instruction required from a user.

20. A module to provide customized notification of recording status to a caller, comprising:

a call related information detector in a customer premises telephone answering device incluiding a single line telephone line interface connected directly to a central office of a telephone company without going trough a costumer premises telephone switch and adapted to detect at least a portion of a telephone number of said caller; and a module in said customer premises telephone answering device adapted to provide a notification signal to said caller regarding a recording status with respect to conversation on said telephone line based on said portion of said telephone number of said caller as compared to a telephone number stored in said customer premise telephone.

21. The module to provide customized notification of recording status to a caller according to claim 20, wherein:

said module is adapted to provide one of a plurality of notification signals as said notification signal.

22. The module to provide a customized notification of recording status to a caller according to claim 20, further comprising:

a module in said telephone answering device including said single line telephone line interface adapted to determine a region from which said caller is calling based on said at least said portion of said telephone number of said caller;

wherein said notification signal is based on said determined region.

23. The module to provide a customized notification of recording status to a caller according to claim 20, wherein:

said notification signal is initiated based on a manual activation by a user.

24. The module to provide a customized notification of recording status to a caller according to claim 20, wherein:

said notification signal is initiated automatically by reception of call related information without further intervention required by a user.

* * * * *